T. E. MURRAY.
VEHICLE WHEEL.
APPLICATION FILED NOV. 1, 1917.
1,270,047.
Patented June 18, 1918.
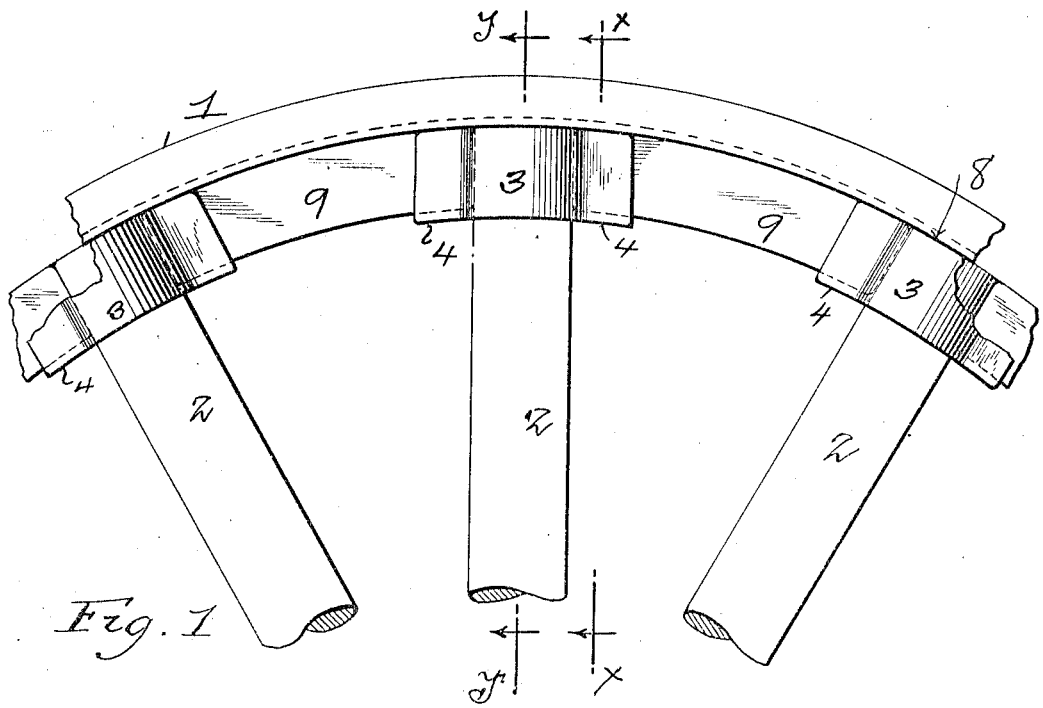
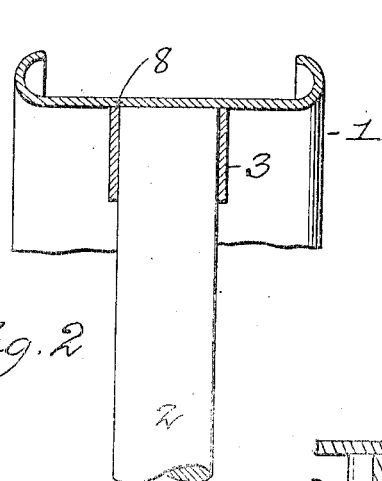
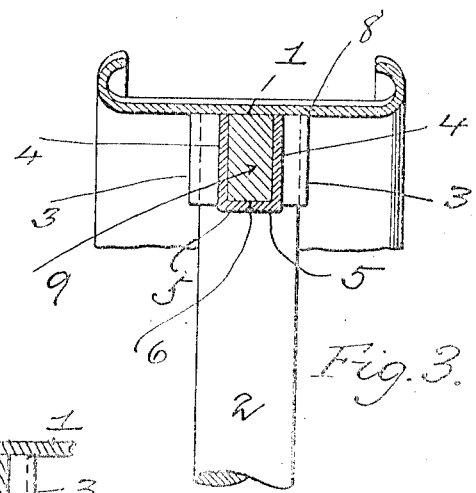
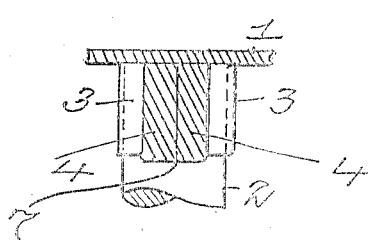
INVENTOR
Thomas E. Murray
BY
ATTORNEY

UNITED STATES PATENT OFFICE.

THOMAS E. MURRAY, OF NEW YORK, N. Y.

VEHICLE-WHEEL.

1,270,047.

Specification of Letters Patent.  Patented June 18, 1918.

Application filed November 1, 1917. Serial No. 199,779.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels, and consists in the construction of the spoke sockets more particularly hereinafter set forth, and the combination of stay pieces therewith.

In the accompanying drawings:—

Figure 1 is an elevation showing three of my spoke sockets connected to a portion of the rim, and to spoke ends of a wheel. Fig. 2 is a section on the line $x$, $x$ and Fig. 3 is a section on the line $y$, $y$ of Fig. 1. Fig. 4 shows in section, also on line $x$, $x$, a modified form of my socket.

Similar numbers of reference indicate like parts.

1 is the wheel rim. At 2, 2, 2 are shown three spokes. Each socket is formed of two precisely similar half sections, preferably stamped, pressed or struck up from sheet metal. Each half section has integrally a semi-circular middle portion 3, and on each side of said middle portion flat wing portions 4. Said wing portions may be each formed with a flat portion and a flange 5, so that when placed together with their concavities opposite to one another, and the flange edges in contact, a chamber will be formed between said wing portions, as shown in Figs. 1 and 3; or said wing portions may be simply solid projections, as shown in Fig. 4, in which case the opposing faces of said projections will be in contact. The meeting edges of flanges 5 are to be electrically welded together as shown in Fig. 3 at 6, or the opposing faces of wing portions 4 are to be welded together on the line 7, as shown in Fig. 4. In either case a circular tube is formed by the said semi-circular portions 3, in which the end of the spoke is seated. The completed sockets are to be electrically welded at their outer edges to the inner surface of the wheel rim, as shown at 8.

The object of making the sockets with chambers between the wing portions is to permit of the ends of stay pieces 9 being inserted in said chambers, if desired, which stay pieces serve to brace adjacent sockets laterally, and so strengthen the wheel.

I claim:

1. A metal vehicle wheel, comprising a metal rim and a spoke socket, the said socket being formed of two half sections of sheet metal, each half section comprising a semi-circular middle portion, and wing portions on each side of and integral with said middle portion, the said half sections being disposed with their respective concavities opposite one another, and having their respective wing portions electrically welded together, and the said socket being electrically welded at a longitudinal edge to said rim.

2. A metal vehicle wheel, comprising a metal rim and a spoke socket, the said socket being formed of two half sections of sheet metal, each half section comprising a semi-circular middle portion, and wing portions on each side of and integral with said middle portion, each of said wing portions having a flange, the said half sections being disposed with their respective concavities opposite one another, and having the edges of the flanges of their wing portions electrically welded together, and the said socket being electrically welded at a longitudinal edge to said rim.

3. In combination with a wheel rim, two sockets as in claim 2, electrically welded at their longitudinal edges to the inner surface of said rim, and a stay piece entering at its ends between the wing portions of said sockets.

In testimony whereof I have affixed my signature in presence of two witnesses.

THOMAS E. MURRAY.

Witnesses:
 GERTRUDE T. PORTER,
 MAY T. McGARRY.